March 1, 1932.  C. CHRISTOFFERSON  1,848,047

SOD VASE

Filed July 3, 1931

Inventor
C. Christofferson
By C. A. Snow & Co.
Attorneys.

Patented Mar. 1, 1932

1,848,047

UNITED STATES PATENT OFFICE

CHRISTIAN CHRISTOFFERSON, OF MADISON, WISCONSIN

SOD VASE

Application filed July 3, 1931. Serial No. 548,694.

This invention relates to a vase for outdoor decorative purposes, as in cemeteries, parks, etc.

It is an object of the invention to provide a vase for holding flowers, the outer surfaces of the structure being covered by a jacket of sod to which moisture is supplied from within the vase.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

Figure 1:
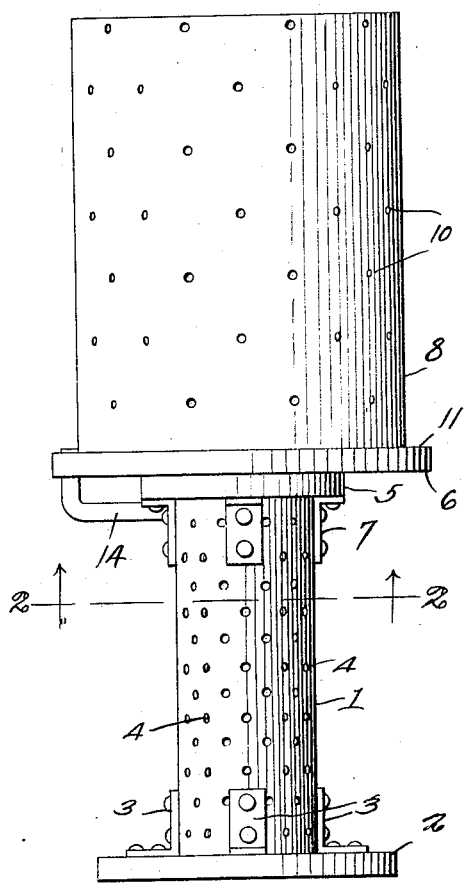
Figure 1 is an elevation of the vase with the sod removed.
Figure 3:
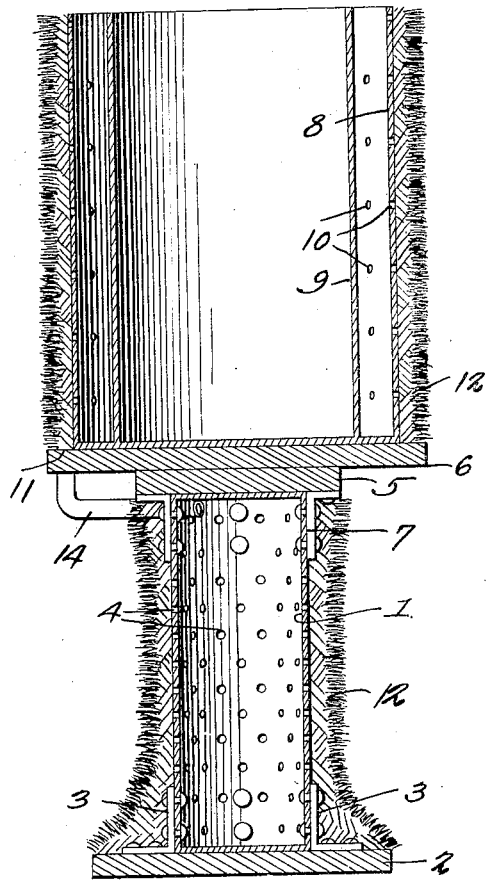
Figure 3 is a vertical section through the complete device.
Figure 2:
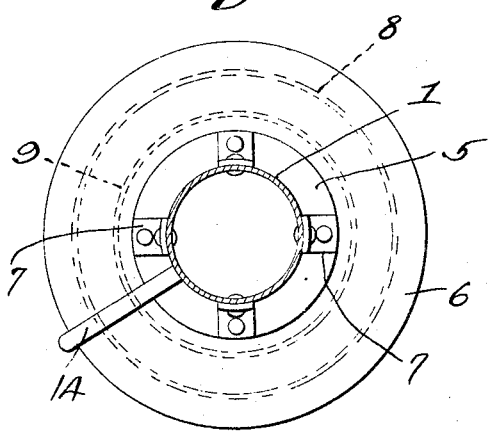
Figure 2 is a section on line 2—2, Figure 1.

Referring to the figures by characters of reference, 1 designates a tubular pedestal closed at the bottom by a base 2 to which it is connected by any suitable means, such as brackets 3. Apertures 4 are provided in the pedestal.

The top of the pedestal is closed by a cap 5 on which is supported a disk 6 extending beyond the pedestal. Brackets 7 or the like can be used to hold these parts together. Disk 6 supports the bottom of the upper section 8 of the vase. This is in the form of a container having a hollow wall 9 open at the top and provided with openings in the outer surface as at 10.

The marginal portion of the disk 6 projects beyond this section 8 to form a ledge 11 on which is supported the lower edge of a jacket 12 of sod extending around section 8 and up to the top thereof. The pedestal 1 is also covered with a jacket 13 of sod which likewise conceals the base 2.

A filling pipe 14 opens into the top portion of pedestal 1.

Water can be supplied to the pedestal 1 through pipe 1 as desired and will seep through small openings 4 so as to nourish the sod jacket 12. Another quantity of water can be poured into the hollow wall of the upper section 8 and will seep through the apertures 10 so as to nourish sod 12. The sod will thus be kept green. The central portion of section 8 can be used for holding cut flowers or growing plants.

What is claimed is:

1. A vase including a tubular pedestal having outlets in the wall thereof, means for directing water into the pedestal, an upper section open at the top and supported by the pedestal, said section having outlets in its wall, and jackets of sod surrounding the pedestal and upper sections.

2. A vase including a tubular pedestal having outlets in the wall thereof, means for directing water into the pedestal, an upper section open at the top and supported by the pedestal, said section having outlets in its wall, a supporting ledge below said section, a jacket of sod surrounding the section and supported by the ledge, and a jacket of sod surrounding the pedestal.

3. A vase including a tubular pedestal having outlets in the wall thereof, means for directing water into the pedestal, an upper section open at the top and supported by the pedestal, said section having outlets in its wall, a supporting ledge below said section, a jacket of sod surrounding the section and supported by the ledge, and a jacket of sod surrounding the pedestal, said upper section having a hollow wall and a central open space surrounded by the wall, said space constituting a flower holder.

In testimony that I claim the foregoing as my own, I have hereto affixed my signature.

CHRISTIAN CHRISTOFFERSON.